(12) United States Patent
Roberts et al.

(10) Patent No.: US 7,891,470 B2
(45) Date of Patent: Feb. 22, 2011

(54) BRAKE ACTUATOR

(75) Inventors: Paul Roberts, Newport (GB); Martin Taylor, Cwmbran (GB); Jonathan Jackson, Herefordshire (GB)

(73) Assignee: Meritor Heavy Vehicle Braking Systems (UK) Limited, Gwent (GB)

( * ) Notice: Subject to any disclaimer, the term of this patent is extended or adjusted under 35 U.S.C. 154(b) by 44 days.

(21) Appl. No.: 12/342,557

(22) Filed: Dec. 23, 2008

(65) Prior Publication Data

US 2009/0159383 A1 Jun. 25, 2009

(30) Foreign Application Priority Data

Dec. 24, 2007 (GB) .................. 0725224.0

(51) Int. Cl.
*F16D 65/16* (2006.01)
(52) U.S. Cl. .................................... 188/72.9
(58) Field of Classification Search .............. 188/71.7, 188/72.9, 79.55–79.58, 153 D, 153 R, 170; 92/63, 130 A
See application file for complete search history.

(56) References Cited

U.S. PATENT DOCUMENTS

| 2,656,018 | A | | 10/1953 | Bent et al. |
| 4,116,114 | A | * | 9/1978 | Swander et al. ........... 92/130 A |
| 4,541,640 | A | | 9/1985 | Tregonning |
| 4,957,193 | A | | 9/1990 | Tamamori |
| 5,181,588 | A | * | 1/1993 | Emmons .................. 188/73.31 |
| 5,215,170 | A | * | 6/1993 | Rapa .......................... 188/170 |
| 5,515,949 | A | * | 5/1996 | Baumgartner et al. ...... 188/72.9 |
| 6,397,986 | B2 | * | 6/2002 | Moore ........................ 188/203 |
| 2006/0131116 | A1 | * | 6/2006 | Plantan et al. .......... 188/153 D |

FOREIGN PATENT DOCUMENTS

| DE | 2337910 | 2/1975 |
| EP | 0279044 | 12/1987 |
| FR | 2318369 | 2/1977 |
| GB | 2156481 | 10/1985 |
| GB | 2263139 | 7/1993 |
| JP | 60049141 | 3/1985 |
| WO | 98/26968 | 6/1998 |
| WO | 03/064232 | 8/2003 |

OTHER PUBLICATIONS

United Kingdom Search Report dated Mar. 28, 2008.
Swedish Search Report dated Sep. 3, 2010 for Application No. 1050238-3.

* cited by examiner

*Primary Examiner*—Christopher P Schwartz
(74) *Attorney, Agent, or Firm*—Carlson, Gaskey & Olds, P.C.

(57) ABSTRACT

A piston-type air brake actuator includes a cylinder having an internal sliding surface of substantially uniform cross-section, a piston dimensioned to have a substantially air tight, axially slidable fit within the cylinder, and a pushrod rigidly secured to the piston for engagement with a pivoting operating shaft of a disc brake. The piston is provided with a compliant peripheral seal to permit articulation of the piston as the pushrod engages the operating shaft during pivoting motion of the operating shaft.

4 Claims, 8 Drawing Sheets

BRAKE ACTUATOR

REFERENCE TO RELATED APPLICATION

This application claims priority to United Kingdom Patent Application No. 0725224.0 filed Dec. 24, 2007.

BACKGROUND OF THE INVENTION

The present invention relates generally to a brake actuator, in particular to an air cylinder actuator for air operated brakes of the type typically found on heavy commercial vehicles.

Two types of pneumatic brake actuators are known. Both types of actuators are mounted to a rear of a brake caliper and include a pushrod that interfaces with a corresponding socket on a lever portion of an operating shaft within the brake caliper. Axial movement of the pushrod causes rotation of the operating shaft. The operating shaft, due to its geometry, causes the long stroke, low force input from the pushrod to be converted to a high force, short stroke output to brake tappets and an inboard brake pad.

In one type of actuator, the pushrod is connected to a flexible diaphragm sandwiched between pressed steel sheets to form an air chamber having two sections divided in an air-tight manner by the diaphragm. Pressurized air is introduced into one of the sections, and the pressure differential causes axial movement of the pushrod. The air chamber is attached to the brake caliper via a bolted connection.

The above actuators have a number of drawbacks. For one, the actuator is bulky and thereby constrains vehicle suspension design. Additionally, the space required for the actuator mounting arrangement constrains the brake housing design and limits space inside the housing for internal components. The flexible diaphragm also has a limited life and requires servicing. The pushrod is only held in contact with the brake operating shaft by the brake's internal return spring. In electrical-park applications which act directly on the operating shaft, the pushrod separates from the operating shaft and has to be guided back into position to re-apply the brake when the operating shaft is locked forward for parking. The joint between the brake and the actuator must also be sealed. Finally, the non-pressurized side of the actuator is vented to atmosphere. Further sealing is therefore required between this area and the brake internals to minimize the risk of foreign matter entering the brake and causing corrosion or other damage.

To address some of these problems, a second type of actuator has been proposed that is a piston-type actuator. In such actuators, the flexible diaphragm is replaced by a rigid piston movable in a cylinder of constant cross-section and having some form of sealing arrangement to enable an air pressure differential to be created that causes axial movement of the piston and pushrod. Examples of such actuators are disclosed in, for example, JP60049141 (Hino Motors), EP0944511 (Knorr-Bremse), and WO03/064232 (Volvo Lastvagnar).

However, it has been found that such known designs still suffer from a number of disadvantages, including, for example, the need to have a deep piston to avoid the piston locking or jamming in use. There have also been difficulties in maintaining an effective seal in conjunction with the combined pivoting and axial movement the pushrod and the cylinder undergo when engaged with a operating shaft lever during actuation, which typically have required the pushrod to pivot with respect to the piston and ensuring that the brake caliper remains free from external contaminants.

The present invention seeks to overcome, or at least mitigate, the problems of the prior art.

SUMMARY OF THE INVENTION

One aspect of the present invention provides a piston-type air brake actuator including a cylinder having an internal sliding surface of substantially uniform cross-section, a piston dimensioned to have a substantially air tight, axially slidable fit within the cylinder, and a pushrod rigidly secured to the piston for engagement with a pivoting operating shaft of a disc brake. The piston is provided with a compliant peripheral seal to permit articulation of the piston as the pushrod engages the operating shaft during pivoting motion of the operating shaft.

A second aspect of the present invention provides a piston-type air brake actuator including an outer cylinder, a liner located within the cylinder having an internal sliding surface of substantially uniform cross-section, and a piston configured to axially slide against the liner while maintaining a substantially air-tight seal.

A third aspect of the present invention provides an air actuated disc brake including a caliper and an air-actuator, the air actuator being separated into a section to be pressurized and non-pressurized section by a slidable piston. The non-pressurized section is in fluid communication with an interior of caliper, and the non-pressurized section and the interior of the caliper are substantially sealed to inhibit ingress of contaminants from the atmosphere.

A fourth aspect of the present invention provides an operating shaft insert for securement to a disc brake operating shaft having a socket for receiving a pushrod of a disc brake actuator, the operating shaft insert being shaped to conform to the socket. The operating shaft insert includes a male or female surface for pivoting contact with the pushrod, and the operating shaft insert is manufactured from a plastics material or a plastics coated material. The operating shaft insert preferably includes a formation to retain the operating shaft insert on the operating shaft. The operating shaft insert may be formed from an engineering plastics material or it may be formed from PTFE on a metallic backing. The surface of the operating shaft insert is preferably cup-shaped. The insert is preferably self-supporting (i.e., it does not require a surrounding structure to engage a pushrod).

A fifth aspect of the present invention provides a pushrod insert for securement to a pushrod of an air brake actuator. The pushrod insert includes a male or female surface for pivoting engagement with a disc brake operating shaft. The pushrod insert preferably further includes a formation for attachment to a pushrod. In one example, the pushrod insert is formed from a steel material. The surface of the pushrod insert is preferably part-spherical. The pushrod insert further includes a retainer formation configured to have an interference fit with a spring retainer plate.

A sixth aspect of the present invention provides a brake subassembly including an operating shaft including an insert according to the fourth aspect of the present invention and a pushrod including a pushrod insert according to the fifth aspect of the present invention. The pushrod insert is configured to interface with the operating shaft insert.

BRIEF DESCRIPTION OF THE DRAWINGS

Embodiments of the present invention will now be described by way of example only, with reference to the accompanying drawings, in which.

DETAILED DESCRIPTION OF THE PREFERRED EMBODIMENT

Figure 1:
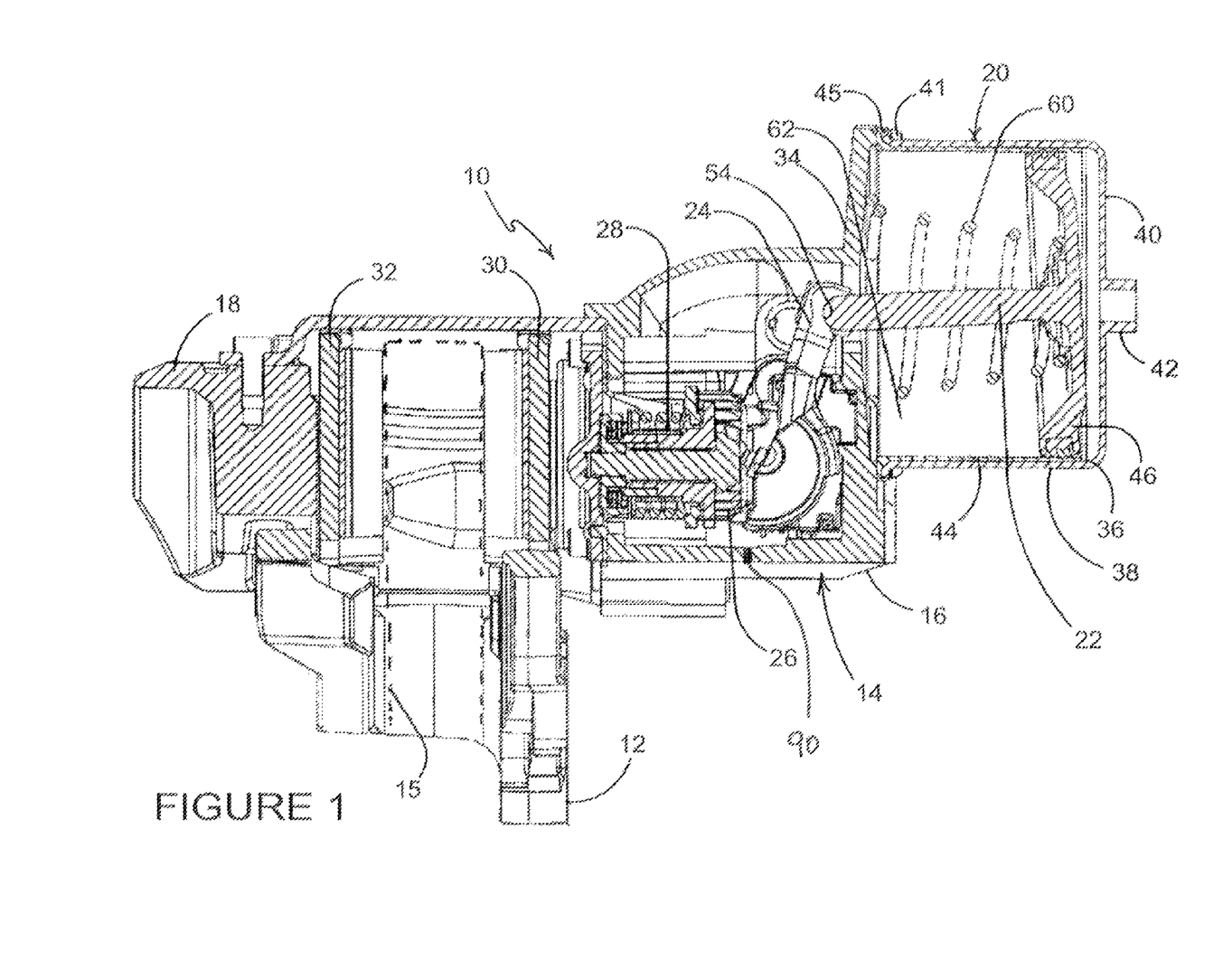
FIG. 1 is a vertical cross-section through a brake incorporating a brake actuator according to one embodiment of the present invention.

With reference to FIG. 1, an air-actuated heavy vehicle disc brake 10 is shown, which includes a brake carrier 12 fixed with respect to an axle of a wheel to be braked, a brake caliper 14 including a housing portion 16 and a bridge portion 18, and an air actuator 20. The heavy vehicle disc brake 10 is of the sliding caliper type, meaning that the brake caliper 14 may slide relative to the brake carrier 12 in a direction parallel to an axis X about which a wheel to be braked (not shown) and a brake rotor 15 rotate. Such sliding occurs when a pushrod 22 causes an operating shaft ("op-shaft") 24 to rotate in a counter-clockwise direction when viewed in FIG. 1, which in turn contacts a tappet 26 of a wear-adjustment mechanism 28, causing an inboard brake pad 30 to advance towards the brake rotor 15. The reaction caused by this contact is transmitted through to the bridge portion 18 of the brake caliper 14 and then to an outboard brake pad 32, which due to the ability of the brake caliper 14 to slide, is also brought into contact with the brake rotor 15. As a result, the brake rotor 15 is clamped between the two brake pads 30 and 32, thus causing a frictional drag load on the brake rotor 15, which retards its rotation.

Considering the construction of the air actuator 20 in more detail, it can be seen that an outboard end wall 34 of the air actuator 20 is cast integrally with an inboard wall of the housing portion 16, and thereby forms a circular plate with an aperture through the middle for the pushrod 22. The remainder of the air actuator 20 is formed from a drawn steel cylinder 36, which includes a cylindrical wall portion 38 having an outboard, out-turned peripheral lip 41 and an inboard end wall 40. The inboard end wall 40 is further provided an air inlet/outlet port 42. The drawn steel cylinder 36 is secured to the outboard end wall 34 of the air actuator 20 by a suitable arrangement of bolts or a peripheral clamp. In other embodiments, a cast cylinder, such as the cast aluminium cylinder shown in FIG. 6, may be used rather than drawn steel.

In order to ensure the optimum surface smoothness and thus the best possible seal for operation of the air actuator 20, a separate liner 44 is provided on an inner face of the cylindrical wall portion 38. The liner 44 may be made from any suitable material, such as non-structural plastics or metal. An inner end 45 of the liner 44 is provided with an out-turned lip that engages between the cast outboard end wall 34 of the air actuator 20 and the corresponding out-turned peripheral lip 41 of the drawn steel cylinder 36 in order to hold the liner 44 in place when the air actuator 20 is assembled.

Figure 2:
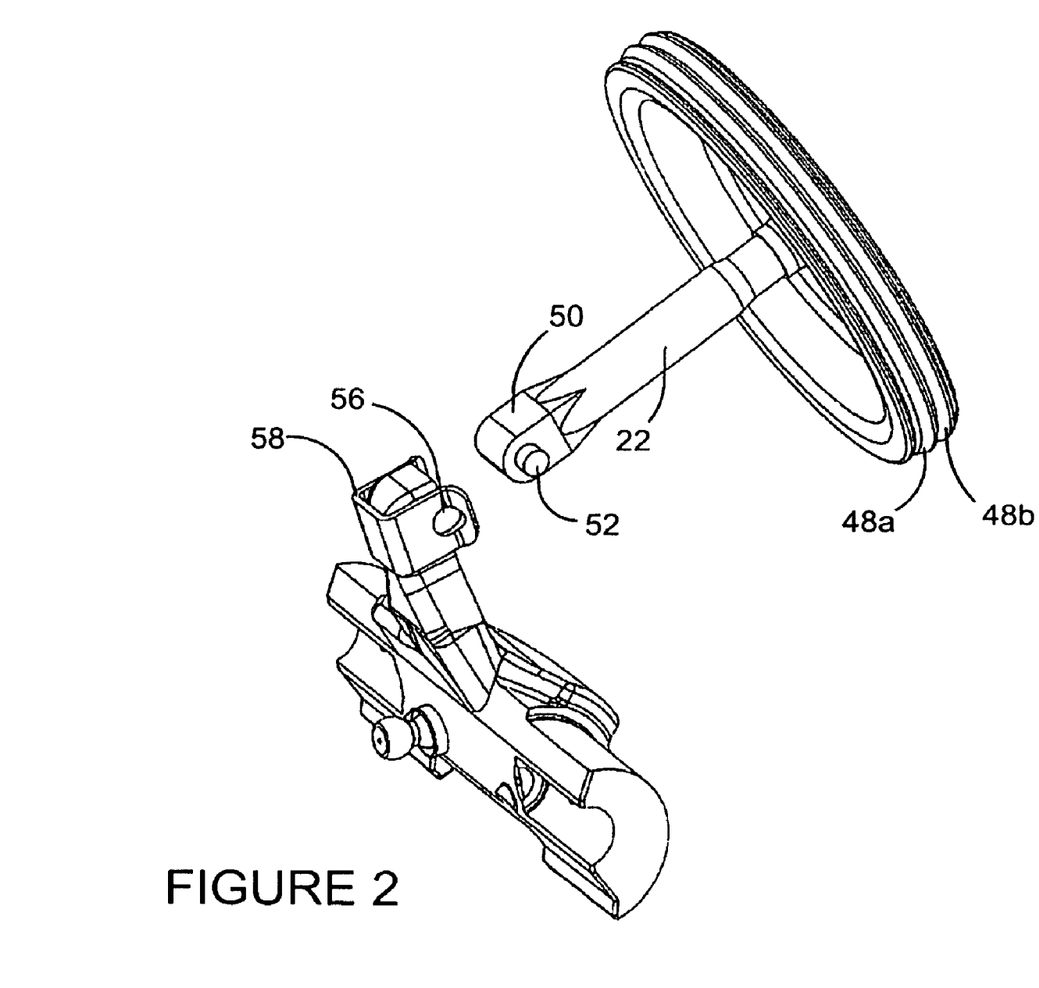
FIG. 2 is an exploded perspective view of a portion of the brake actuator of FIG. 1.
Figure 3:
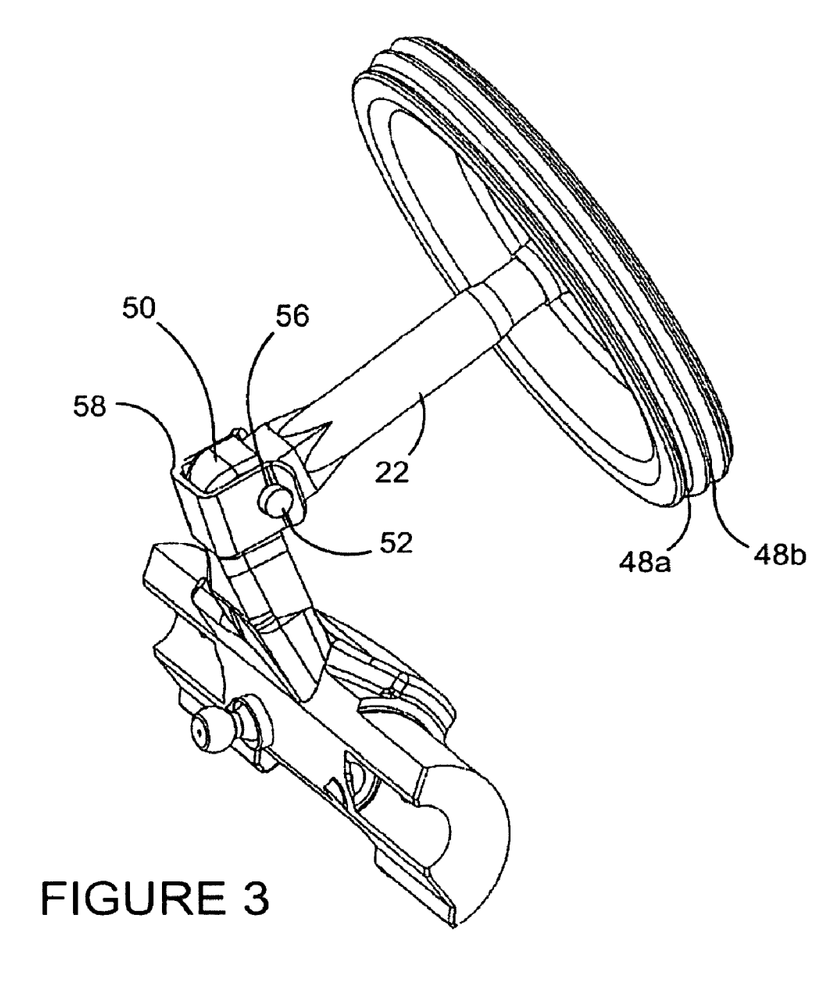
FIG. 3 is a view of the same component shown in FIG. 2 in an assembled together state.

A piston 46 is slideably mounted within the drawn steel cylinder 36 and in this embodiment is integral with the pushrod 22. With reference to FIGS. 2 and 3, it can be seen that the piston 46 is provided with a double seal 48a and 48b extending around a circumferential edge thereof in order to contact the liner 44. In other embodiments, a double or single seal with an arcuate, preferably circular, cross-section portion where it seals against the cylinder may be used instead. Typically, the piston 46 pivots through approximately 4° in addition to its axial movement, and the seal needs to maintain its integrity throughout this range of motion.

In this embodiment, an end 50 of the pushrod 22 of the present invention terminates in a semi-cylindrical (rather than hemispherical) end having first and second cylindrical side projections 52 (only one visible in FIGS. 2 and 3) that are configured to engage a complimentary socket 54 on the op-shaft 24 and first and second apertures 56 (only one visible) on a U-shaped retaining clip 58. This arrangement enables the pushrod 22 to be secured to the op-shaft 24 in a push fit manner and enables the two components to stay connected together throughout the full axial and arcuate range of motion of the piston 46. In other embodiments, a spherical ball-type connection or other suitable arrangements may be used.

A helical return spring 60 is mounted between the outboard end wall 34 of the air actuator 20 and the inboard wall of the piston 46 to ensure that the piston 46 returns to its brakes-off position when air pressure is released from the air actuator 20. In addition, since the pushrod 22 and the op-shaft 24 are held together, the helical return spring 60 also helps to return the op-shaft 24 to its brakes-off position. This has the benefit that the helical return spring 60 in the housing portion 16 may be weaker and therefore lighter than usual since it no longer has to move the op-shaft 24.

It will also be noted from FIG. 1 that an unpressurized section 62 of the drawn steel cylinder 36 (i.e., the section to the outboard side of the piston 46) is in fluid communication with an interior of the housing portion 16, and furthermore the unpressurized section 62 does not have an air vent to the atmosphere. As a result, the interior of the housing portion 16 and the unpressurized section 62 are hermetically sealed from the atmosphere and will be subjected to increases in the internal pressure when the piston 46 moves to the left to apply the brake.

This increased pressure is contained within the housing portion 16 where the tappets 26 project therethrough in order to engage the inboard brake pad 30 by secondary seals and expander/adjuster mechanisms of the type disclosed in the Applicant's patent EP1261817, the contents of which are specifically incorporated herein by reference. Such a hermetically sealed interior has advantages for increasing the working life of the brake since there is a reduced risk of contaminants, such as water and salt, entering the interior of the air actuator 20 and the brake caliper 14, causing corrosion. In alternative embodiments, the housing portion 16 or the unpressurized section 62 of the cylinder may be provided with a one-way valve 90 that permits excess pressure above a certain level to be vented to the atmosphere, but which prevents the ingress of air from the atmosphere into the housing.

Figure 4:
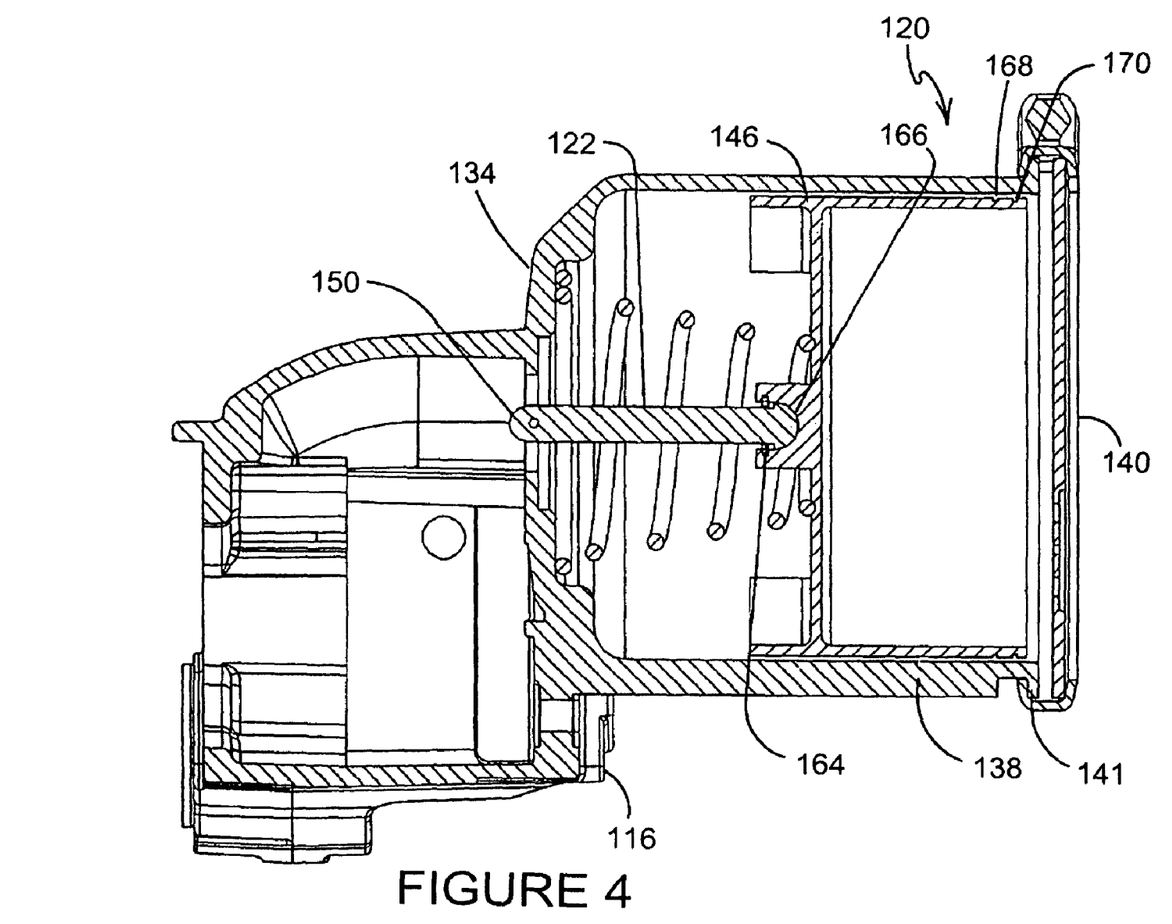
FIG. 4 is a cross-section through a brake actuator according to a second embodiment of the present invention.

Referring now to FIG. 4, an alternative actuator 120 is disclosed. It can be seen by comparison with the air actuator 20 of FIG. 1 that a cylindrical wall 138 and an outboard end wall of an air cylinder 134 are integral with a housing 116. An inner face of the cylindrical wall 138 is machined to provide a good sealing surface for a piston 146. Indeed, only an inboard end wall 140 is formed as a separate pressed steel component that is clamped onto an out-turned lip 141 on an inboard edge of the cylindrical wall 138. Furthermore, in this embodiment, a pushrod 122 is no longer integral with the piston 146. Instead, the pushrod 122 is capable of pivoting at its interface with the piston 146 due to a ball and socket connection 164 and 166 between the two components. The connection at an op-shaft end 150 of the pushrod 122 is however the same as in the first embodiment.

Due to the ball and socket connection 164 and 166, a seal between the piston 146 and the cylindrical wall 138 may be simplified (as it is not required to pivot), and two relatively small o-ring type seals (not shown) are provided in recesses 168 and 170 extending circumferentially around an outer face 172 of the piston 146.

Figure 5:
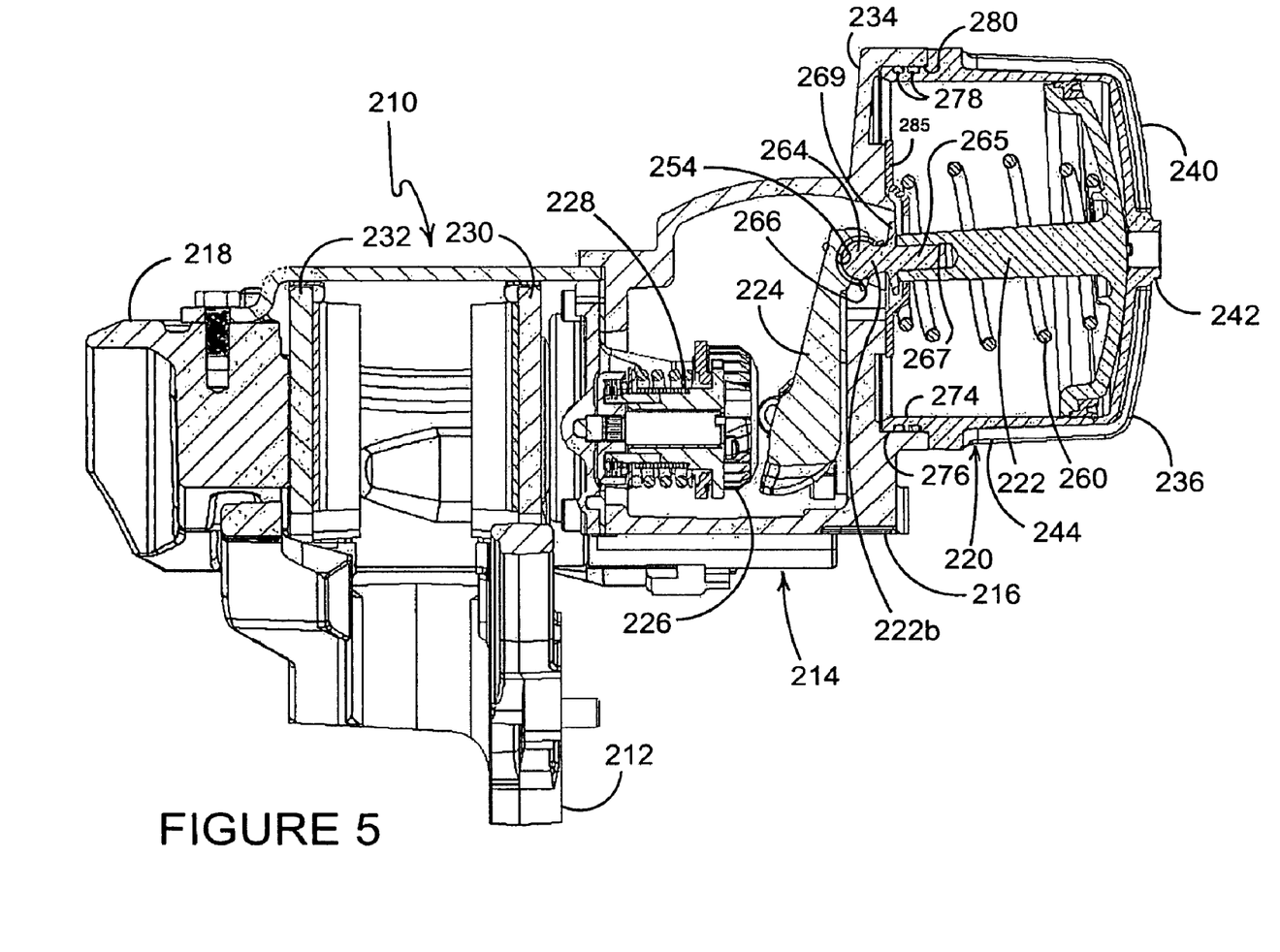
FIG. 5 is a cross-section through a brake according to a third embodiment of the present invention.

Referring now to FIG. 5, a further embodiment of the present invention is illustrated. Like parts have been indicated by like references with the addition of the prefix "2". The air actuator 220 and the op-shaft 224 shown in FIG. 5 differ significantly from those of the earlier embodiments. As before, the outboard end wall 234 of the air actuator 220 is cast integrally with the inboard wall of the brake caliper housing 216. However, the remainder of the air cylinder is formed from a machined aluminium casting 236 provided with strengthening ribs similar to those shown in the embodiment of FIG. 6, discussed below. No liner is required in this embodiment due to the machined inner cylindrical face 274 of the machined aluminium casting 236. However, in alternative embodiments, a liner may be provided so that the machined aluminium casting 236 does not require machining.

To provide an air tight seal between the machined aluminium casting 236 and the outboard end wall 234 of the air actuator 220, a radially outward facing portion 276 of the machined aluminium casting 236 is machined smooth and provided with a pair of recesses to locate a pair of axially spaced o-ring seals 278 which seal against a complimentary machined inwardly facing surface 280 of a lip of the air cylinder outboard end wall 234. Other suitable sealing arrangements may be used.

Figures 6, 6A:
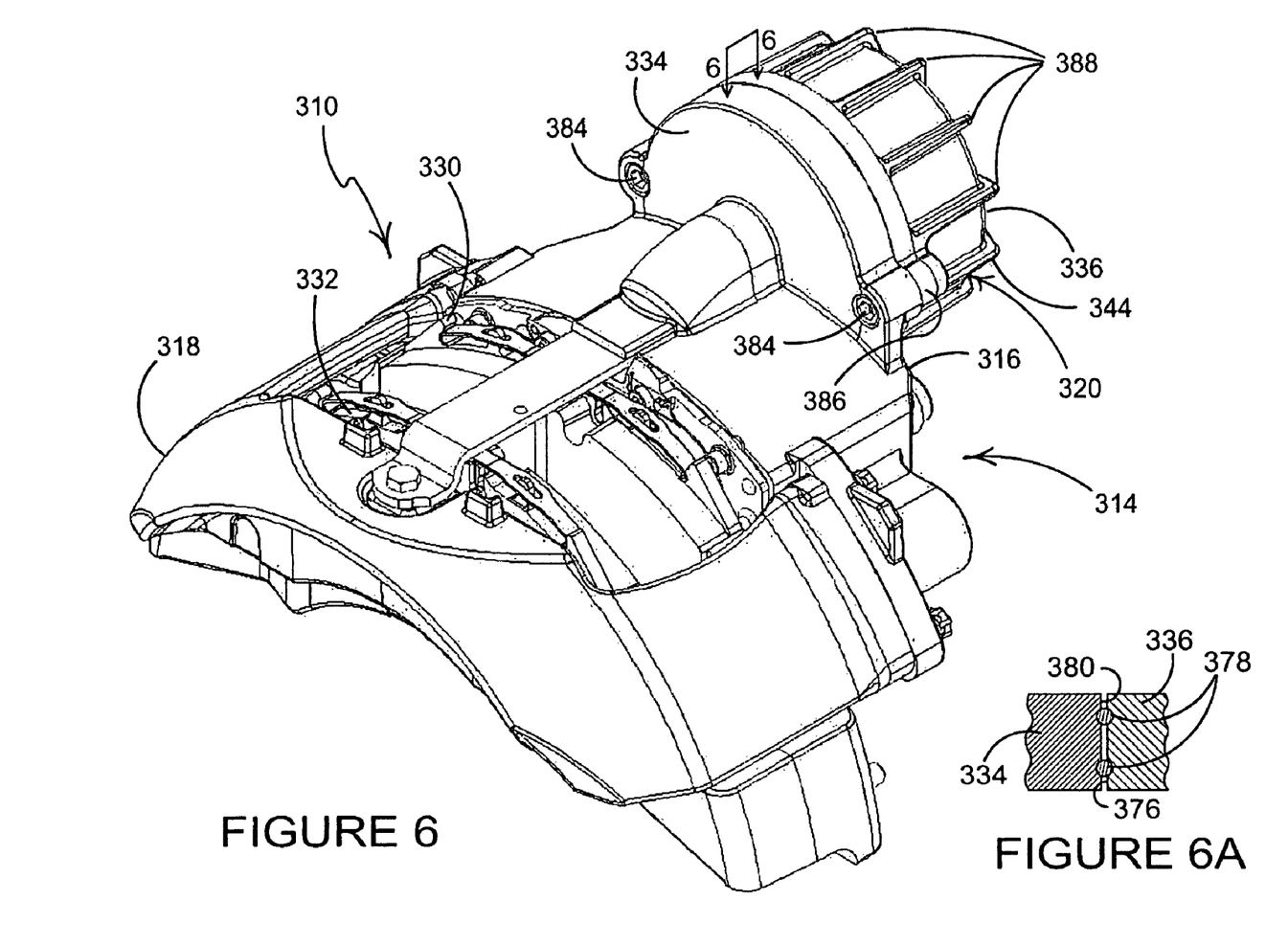
FIG. 6 is a perspective view of a brake according to a fourth embodiment of the present invention.
FIG. 6A is a cross-section through the line 6-6 of FIG. 6.

The machined aluminium casting 236 is secured to the outboard cylinder end-wall 234 by two inboard directed bolts and complementary threaded bores (not visible in FIG. 5) in a similar way to the connection illustrated in FIG. 6. Other suitable ways of securing the casting to the end wall may alternatively be used.

In addition, in this embodiment the construction of the pushrod 222 and the op-shaft 224 also differs from the first and second embodiment. The majority of the pushrod 222 is an aluminium die cast component. Alternatively, it could be fabricated from steel. However, a male insert 222b including a ball 264 together with a shank 265 is formed from steel. As can be seen from FIGS. 7, 8A and 8B in particular, in this embodiment, the ball 264 is spherical. The shank 265 is inserted into a complementary bore 267 of the pushrod 222. The connection between the shank 265 and the complementary bore 267 may be an interference fit, a screw fit, by adhesive, or by any other suitable manner. In alternative embodiments, the insert 222b may be formed from brass or other suitably durable material. The steel insert may be hardened, but this may not be necessary if the plastics female op-shaft insert 266 is also employed (see below).

Figure 7:
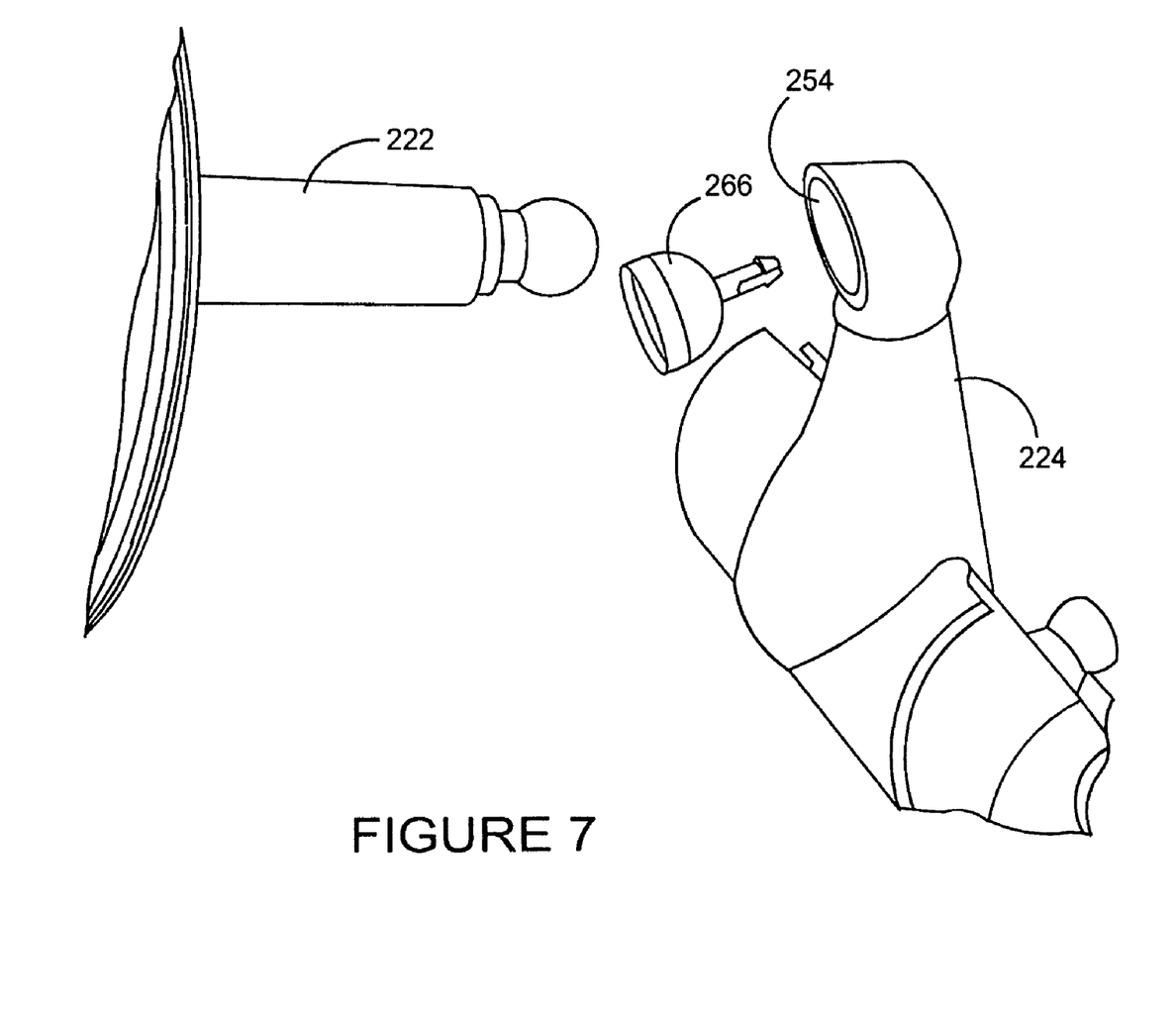
FIG. 7 is a perspective view of a pushrod to op-shaft connection of FIG. 5.
Figure 8A:
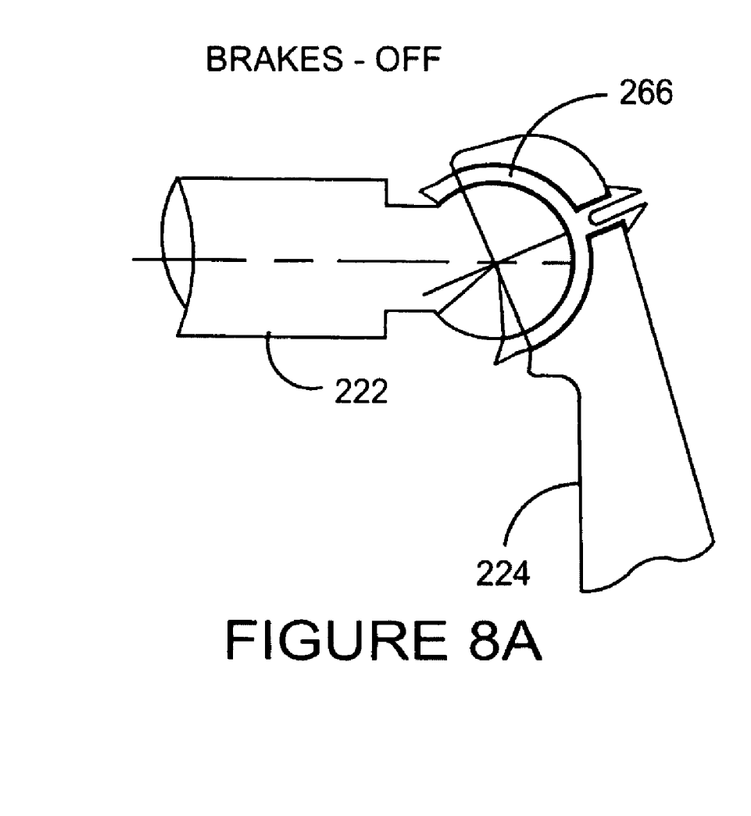
FIGS. 8A and 8B are side views showing the pushrod to op-shaft connection in a brakes-off and brakes-on condition, respectively.
Figure 8B:
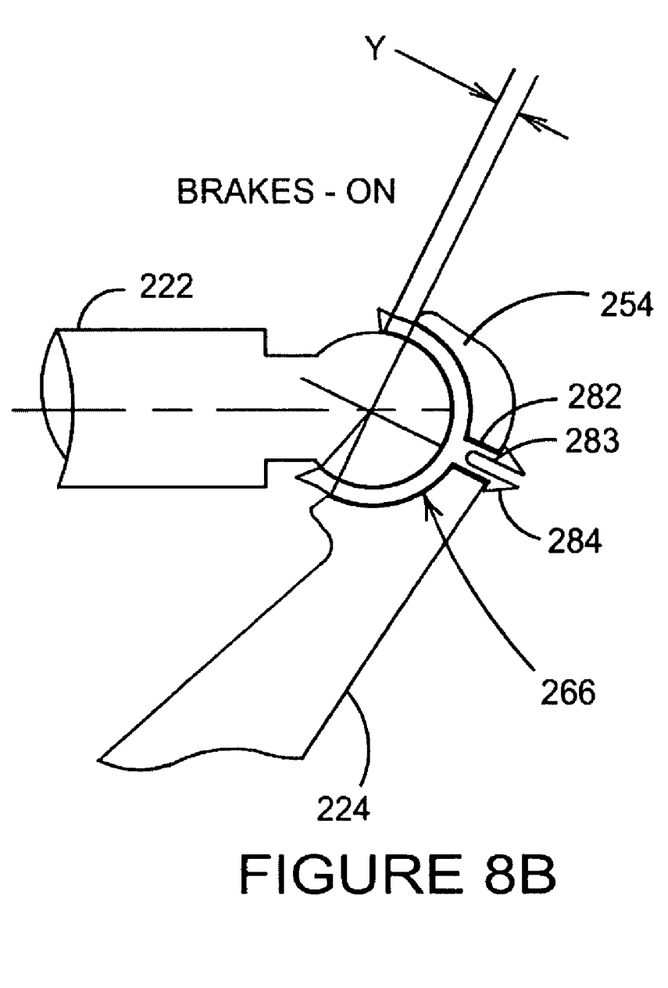

To receive the ball 264, a complimentary plastic female op-shaft insert 266 is provided in the op-shaft socket 254, as can also be seen more clearly in FIGS. 7, 8A, and 8B.

The op-shaft insert 266 is formed from a suitable engineering plastics material, such as nylon, and is dimensioned to conform to the shape of the op-shaft socket 254 and is cup-shaped to receive the ball 264. The op-shaft insert 266 projects beyond the op-shaft socket 254 by a distance Y and closes in around the ball 264 slightly in order to retain the ball 264 therein in a snap-fit manner. However, the shape of the ball 264 and the op-shaft insert 266 permit sufficient relative articulation therebetween to provide unhindered rotation of the op-shaft 224 between the brakes-off position (FIG. 8A) and the brakes-on positions (FIG. 8B). In other embodiments, the op-shaft insert 266 may be formed from a plastics coating on a metallic (e.g., steel) backing. In this embodiment, a suitable plastics coating may be Polytetra-fluoroethylene (PTFE) or a similar low friction coating.

In order to retain the op-shaft insert 266 within the op-shaft socket 254, a small hole 282 is provided through the op-shaft socket 254. The op-shaft insert 266 includes an arm 283 that terminates in a pair of barbed projections 284 with a slit therebetween. The arm 283 is inserted into the small hole 282 so that the pair of barbed projections 284 engage behind the outboard face of the op-shaft 224 and retain the op-shaft insert 266 in place.

Conventionally, it is known to either use precision forging techniques to obtain a suitably smooth and hard connection between the pushrod ball and the op-shaft socket, or to cast the op-shaft 224 and fabricate the pushrod 222, and to induction harden the contact surfaces in order to meet the necessary requirements for strength and durability. By using the plastics inserts, costs may be saved since a standard forging may be used rather than a precision forging or an induction hardened forging.

As can be seen from the FIG. 5 embodiment, the shank 265 of the ball 264 may be provided with a retainer formation in the form of a circular collar 269. Before the machined aluminium casting 236 and the pushrod 222 are assembled onto the inboard wall of the brake calliper housing 216, the circular collar 269 may be retained by the edges of a slotted aperture in a plate spring retainer 285, thus keeping the spring 260 in a compressed state. This makes assembly of the cylinder piston and the pushrod subassembly easier since the production line worker does not need to compress the spring to connect the subassembly to the housing.

Turning now to FIGS. 6 and 6A, like parts are labelled with like numerals but with the addition of the prefix "3," and the internal components of the illustrated brake 310 are the same as those of the brake 210 of the third embodiment. However, in this embodiment, the seal between the end surface 376 of the casting 336 and a complementary mating surface 380 of the end wall 334 of the cylinder differs from the third embodiment. In this embodiment, the end surfaces 376 and 380 are machined smooth and provided with circular recesses for a pair of o-rings 378 that extend concentrically with respect to each other to provide a good seal between the casting 336 and the end wall 334.

The casting 336 is secured to the housing by a pair of bolts 384 extending inboard from the end face into corresponding threaded bores provided in thickened portions 386 of the casting 336. To improve packaging, the heads of the pair of bolts 384 are flush with the inboard side of the end face when screwed into place.

As mentioned above, to provide an optimized strength to weight ratio, the casting 336 has a plurality of stiffening ribs extending radially outwards from the center of the inboard end wall and axially along the cylindrical wall thereof.

The arrangements described above provide a number of advantages over conventional diaphragm type air actuators. A smaller diameter of piston (e.g., 160 millimeters compared to 220 millimeters) can be provided compared to a diaphragm air actuator, which reduces the space envelope used. Alternatively, the same diameter of piston can be used and the air pressure reduced or the force applied at the pushrod end increased. A smaller diameter piston may also reduce the overall weight of the brake. By having a cast outboard wall of the cylinder, it is possible to angle the cylinder relative to the caliper housing without encountering problems related to bolting the entire cylinder to the housing, as with conventional diaphragm cylinders. By providing a space that includes the interior of the caliper housing and the unpressurized side of the actuator from which the ingress of atmospheric air is prevented, the convoluted boot-type seal between the unpressurized section of the actuator and the internal volume of the brake may be eliminated. This may extend the life of the actuator, since it is no longer subjected to the danger of corrosion caused by the ingress of contaminants from outside. By connecting the pushrod to the op-shaft, the actuator return spring can be used to return the op-shaft, thus enabling a lighter return spring in the brake housing to be used or vice versa.

In addition, if the caliper is fitted with an electrically-actuated parking brake mechanism that acts directly on the op-shaft (e.g., a parking brake of the type disclosed in the Applicant's earlier published application EP1596089), then the speed of release of the parking brake may be increased since it is no longer necessary to guide the pushrod into contact with the operating shaft to apply the service brake so that the parking brake can be removed. Finally, by varying the thickness of liners used on the interior of the cylinder, a range of piston diameters may be provided for the same cylinder.

The terms inboard and outboard as used herein refer to the orientation of parts of brakes with respect to their usual positioning within a vehicle. Such terms should not, however, be considered limiting.

It should be understood that numerous changes may be made within the scope of the present invention. For example, the cylinder of FIG. 1 may be used in conjunction with the piston arrangement of FIG. 4. The actuators may be used on different types of brakes, such as fixed caliper disc brakes. The orientation of the air chamber may be altered e.g., it may be angled upwards or downwards with respect to the axis X. Alternative materials may be employed for the cylinder such as aluminium, and it may be formed by pressing or hydroforming as alternatives to drawing and casting. A female insert may be provided on the pushrod and a male insert on the op-shaft. Alternative ways of securing the op-shaft insert to the op-shaft may be used, such as adhesive, heat bonding or over molding.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An air actuated disc brake comprising:
   a caliper having an interior; and
   an air-actuator including a cylinder, wherein an outboard end wall of the cylinder is an integral portion of the caliper and a remainder of the cylinder includes a cylindrical wall portion having an inboard end wall, wherein the cylindrical wall portion is releaseably secured to the calliper proximate the outboard end wall,
   wherein the air actuator is separated in a section to be pressurized and a non-pressurized section by a slidable piston, wherein the non-pressurized section in fluid communication with the interior of the caliper, and the non-pressurized section and the interior of the caliper are substantially sealed to inhibit ingress of contaminants from the atmosphere.

2. The air actuated disc brake according to claim 1 including a substantially air-tight seal between the caliper and a tappet located within the caliper.

3. The air actuated disc brake according to claim 1 wherein the non-pressurized section is provided with a one-way valve to permit egress of air.

4. The air actuated disc brake according to claim 1 wherein the caliper includes a housing portion including an inboard wall, and the outboard end wall of the cylinder is cast integrally with the inboard wall of the housing portion to form a circular plate including an aperture for a push rod.

* * * * *